[15] 3,637,294
[45] Jan. 25, 1972

[54] INTERFERENCE FILTER WITH ALTERNATELY DESIGNED PAIRS OF DIELECTRIC LAYERS

[72] Inventor: John W. Berthold, III, Tucson, Ariz.

[73] Assignee: Bell Telephone Laboratories, Incorporated, Murray Hill, N.J.

[22] Filed: Dec. 19, 1969

[21] Appl. No.: 886,721

[52] U.S. Cl. ............................350/166, 117/33.3, 350/321
[51] Int. Cl. ...............................................G02b 5/28
[58] Field of Search ........................350/1, 163–166, 350/321; 117/33.3

[56] References Cited

UNITED STATES PATENTS 2,624,238  1/1953  Widdop et al.....................350/166 X

FOREIGN PATENTS OR APPLICATIONS 1,028,899  3/1953  France................................350/166

OTHER PUBLICATIONS

Gisin et al., " Interference Filters Transmitting Short–Wavelength and Reflecting Long–Wavelength Spectral Regions," Optics & Spectroscopy, Vol. XIV, No. 3, March 1963, pp. 210–212.

Primary Examiner—David Schonberg
Assistant Examiner—Toby H. Kusmer
Attorney—R. J. Guenther and Arthur J. Torsiglieri

[57] ABSTRACT

This filter comprises a plurality of superimposed layers in which layers of a first material having a first index of refraction alternate with layers of a second material having a second index of refraction, thereby defining a plurality of high-index—low-index pairs of layers, and at least some high-index—low-index pairs of layers having a first optical thickness alternate with at least some high-index—low-index pairs of layers having a second optical thickness. Also described is an optimized design derived from this filter. Such filters can be formed by deposition of the layers on a substrate by calculating in advance the slope of the reflectance versus thickness curve that should be observed when each layer has its desired thickness and then, when forming the layers, by terminating the deposition of each layer when the slope of the reflectance versus thickness curve for the layer being deposited equals the calculated slope.

10 Claims, 6 Drawing Figures

PATENTED JAN 25 1972

INTERFERENCE FILTER WITH ALTERNATELY DESIGNED PAIRS OF DIELECTRIC LAYERS

BACKGROUND OF THE INVENTION

This relates to optical filters and more particularly to high-quality multilayer, dielectric-coated mirrors.

Typical dielectric mirrors are comprised of a quartz substrate coated with a multilayer stack of dielectric films in which layers of a high index of refraction dielectric, such as zinc sulfide, alternate with layers of a low index of refraction dielectric, such as thorium fluoride. Ordinarily, the optical thickness of each layer, which is defined as the product of the index of refraction times the geometrical thickness of the layer, is chosen to be one-quarter the wavelength at which maximum reflectance (or maximum reflectivity) is desired; and 40 or more layers of dielectric may be used.

To achieve optimum reflection over a band of wavelengths, some mirror designs use several stacks of such high-index—low-index layers in which the optical thicknesses of the layers differ from one stack to another. For example, the first 17 layers of a 34 layer dielectric coating might be one optical thickness and the second 17 layers might be another thickness. In such a case, each optical thickness is, of course, proportional to a particular wavelength; and the reflectance bandwidth of such a mirror is typically centered approximately midway between these characteristic wavelengths. Such an arrangement works satisfactorily to give mirrors that have reflectances in the range of approximately 99.5–99.9 percent over most of the reflectance bandwidth.

However, for some applications, notably use in parametric devices, it is desirable to form mirrors of comparable bandwidth that reflect a little less of the incident radiation and transmit rather than absorb substantially all the unreflected radiation. A pair of such mirrors, which would have for example a reflectance of about 98 to 99 percent and a transmittance of about 2 to 1 percent, and a crystal of a nonlinear material such as lithium niobate located between the mirrors can be used as a parametric oscillator because the mirrors reflect over a wide range of wavelengths enough radiation to sustain oscillation while at the same time they transmit enough radiation to be utilized. However, it does not seem possible with designs of the prior art to form such mirrors with reflectances of, for example, 98 to 99 percent, and little absorption because a reduction in the number of layers in the coating, which ordinarily would reduce the reflectance, also reduces the bandwidth and produces areas of undesirably low reflectance. Further details on this phenomenon are disclosed by A. F. Turner and P. W. Baumeister at pages 69 and 71 of their paper, "Multilayer Mirrors with High Reflectance over an Extended Spectral Region," *Applied Optics*, Vol. 5, page 69 (Jan. 1966). Other mirror designs are disclosed in the paper by P. W. Baumeister and J. Stone entitled "Broad-Band Multilayer Film for Fabry-Perot Interferometers," *Journal of the Optical Society of America*, Vol. 46, page 228 (Mar. 1956), and in Baumeister's paper, "Design of Multilayer Filters by Successive Approximations," *Journal of the Optical Society of America*, Vol. 48, page 955 (Dec. 1958).

SUMMARY OF THE INVENTION

Accordingly, it is an object of this invention to provide a design for a mirror having a reflectance of approximately 98 to 99 percent over a wide band of wavelengths. And it is a further object of this invention to provide a mirror with such a reflectance that transmits rather than absorbs the radiation it does not reflect.

These and other objects of the invention are achieved by a design in which layers of a material having a high index of refraction alternate with layers of a material having a low index of refraction, thereby defining high-index—low-index pairs of layers, and at least some high-index—low-index pairs of layers having a first optical thickness are interleaved with high-index—low-index pairs of layers having a second optical thickness. Consequently, the general pattern in the proposed design is air . . . AABB . . . AABB . . . substrate
     HLHL     HLHL in which each column represents a different layer of the dielectric mirror and A and B represent the particular optical thickness of the layer while H and L represent the particular index of refraction (high and low, respectively) of the layer. With this general pattern as a start and well-known methods for calculating the reflectance and transmission of light at the boundary of each layer, it is possible to produce mirror designs that have reflectances of approximately 98 to 99 percent and little absorption over wide bandwidths.

A multilayer optical filter typically is formed by evaporation in a commercial vacuum coating unit. Extensive details of such a unit and the process ordinarily used in forming multilayer mirrors are disclosed by D. L. Perry in his paper, "Low-loss Multilayer Dielectric Mirrors," *Applied Optics*, Vol. 4, page 987 (Aug. 1965). Briefly, layers of one dielectric material and then another dielectric material are alternately evaporated to the desired thickness on a substrate. When the desired optical thickness of each layer is always one-quarter the wavelength at which maximum reflectance is desired, it is relatively easy to determine when a quarter wavelength thickness of dielectric material has been deposited because at that point the plot of reflectance at the desired wavelength versus optical thickness goes through a maxima or a minima. Consequently, when depositing each layer of the mirror, an operator of the vacuum coating unit need only plot the observed reflectance at the desired wavelength versus thickness; and, whenever this plot goes through a maxima or a minima, he can terminate the deposition of one dielectric material and initiate deposition of another. Such a procedure, however, is not accurate enough to be used with the proposed design where adjacent layers being deposited have different optical thicknesses.

Accordingly, it is a further object of this invention to expedite the formation of dielectric mirrors comprised of layers having different optical thicknesses.

This and other objects of my invention are achieved by determining in advance of the formation of the mirror the slope of the plot of reflectance at a monitoring wavelength versus layer thickness that should be observed when each layer to be formed has various incremental optical thicknesses. Then, when the mirror is being fabricated, the reflectance at the monitoring wavelength is determined continuously; and deposition of a given layer is terminated when the slope of the reflectance versus thickness curve that is observed becomes substantially the same as the slope that was calculated in advance.

DETAILED DESCRIPTION OF THE DRAWING

These and other objects and features of my invention will be more fully appreciated from a consideration of the following detailed description, taken in conjunction with the accompanying drawing, in which.

Figure 1:
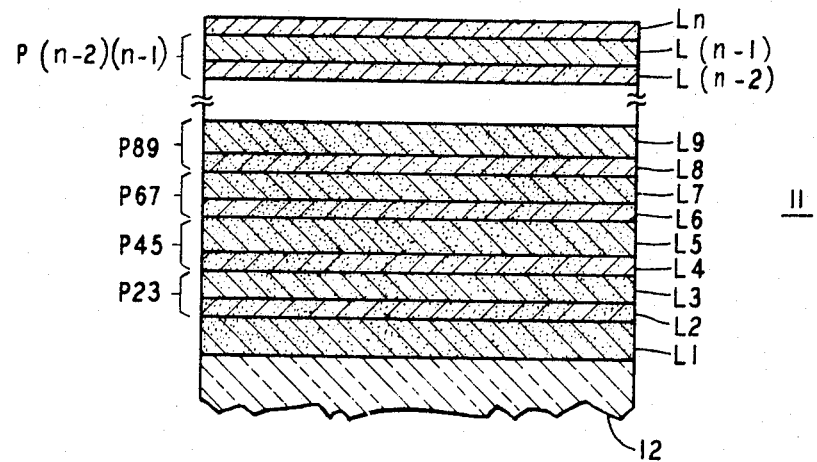
FIG. 1 is a schematic representation of a first illustrative embodiment of my invention.

In FIG. 1 there is shown a fairly simple mirror 11, which is an illustrative embodiment of my invention. Mirror 11 comprises a substrate 12 that typically is made of quartz, a first layer L1 that is deposited on substrate 12, and a multitude of layers L2 to L$n$, where $n$ is an even number, that are deposited one after another on the preceding layer. The index of refraction of first layer L1, third layer L3, and every odd-numbered layer L(n-1), where n is an even number, ideally is the same and is as low as possible. In fact, however, the index of refraction of the first layer L1 deposited on substrate 12 varies with its geometrical thickness; and for the thickness that I have used for the first layer, the index of refraction is not exactly the same as that of the other odd-numbered layers. Similarly, the index of refraction of second layer L2, fourth layer L4, and every even-numbered layer Ln, where n is an even number, typically is the same and is as high as possible. Illustratively, the odd-numbered layers are layers of thorium fluoride, probably containing unknown amounts of thorium oxyfluoride, that have a refractive index of approximately 1.51, and the even-numbered layers are layers of zinc sulfide that have a refractive index of approximately 2.40.

Despite the differences in the index of refraction of the even-numbered layers and the odd-numbered layers, the geometrical thickness of each layer in typical prior art dielectric mirrors is ordinarily varied so that the optical thickness of each of several consecutive layers is the same and is equal to one-fourth of the wavelength at which maximum reflectance is desired. And even in mirrors designed for maximum reflectance over a band of wavelengths, the typical design simply uses several consecutive layers of one optical thickness stacked on top of several consecutive layers of a second optical thickness. For example, as described above in the background of the invention, one group of 17 consecutive layers of alternating refractive index typically have such compensating variations in geometrical thickness that each layer has the same first optical thickness; and a second group of 17 consecutive layers deposited on top of the first group of layers have similar variations in refractive index and geometrical thickness so that each layer in the second group has a second optical thickness. In such a mirror, the reflectance bandwidth is usually centered about midway between the two characteristic wavelengths related to the two optical thicknesses. Other designs for wideband dielectric mirrors have also been devised as, for example, in the above-cited paper by P. W. Baumeister where every one of 15 layers has a different optical thickness, and in the above-cited paper by P. W. Baumeister and J. M. Stone where most of the layers have a different optical thickness and any layers having the same optical thickness are grouped together.

In my invention, however, I define a series of high-index—low-index pairs of layers. For example, layers L2 and L3 are designated high-index—low-index pair P23; layers L4 and L5 are designated pair P45; layers L6 and L7 are designated pair P67; layers L8 and L9 are designated pair P89; and in general, layers L(n-2) and L(n-1) are designated pair P(n-2)(n-1), where n is an even number. And I vary the optical thicknesses of the layers so that at least some high-index—low-index pairs of layers having a first optical thickness alternate with at least some high-index—low-index pairs of layers having a second optical thickness. Thus each of the layers in pairs P23 and P67 would have one optical thickness while each of the layers in pairs P45 and P89 would have a second optical thickness.

For even greater maximum reflectance bandwidths, I have found it is feasible to stack on top of each other additional sets of such alternate-optical-thickness pairs of layers. Thus, in FIG. 2 there is disclosed a typical two-stack mirror 21 comprising a substrate 22 that is typically made of quartz, a first layer 2L1 that is deposited on substrate 22 and a multitude of layers 2L2 to 2Ln, where n is an even number, deposited one after another on the preceding layer. As with the mirror shown in FIG. 1, every odd-numbered layer has an index of refraction that ideally is the same and is as low as possible, and every even-numbered layer has an index of refraction that is the same and is as high as possible. Again, according to my invention, a series of high-index—low-index pairs of layers are defined in which, for example, layers 2L2 and 2L3 are designated high-index—low-index pair 2P23 and layers 2L(n-2) and 2L(n-1) are designated pair 2P(n-2)(n-1), where n is an even number. As before, pairs of layers such as 2L2 and 2L3 having a first optical thickness alternate with pairs of layers such as 2L4 and 2L5 having a second optical thickness. In addition, however, other pairs of layers such as 2L(n-8) and 2L(n-7) having a third optical thickness alternate with other pairs of layers such as 2L(n-6) and 2L(n-5) having a fourth optical thickness. As a result, mirror 21 is comprised of several pairs of layers in which at least some high-index—low-index pairs of layers having a first optical thickness alternate with at least some high-index—low-index pairs of layers having a second optical thickness and at least some high-index—low-index pairs of layers having a third optical thickness alternate with at least some high-index—low-index pairs of layers having a fourth optical thickness.

Figure 2:
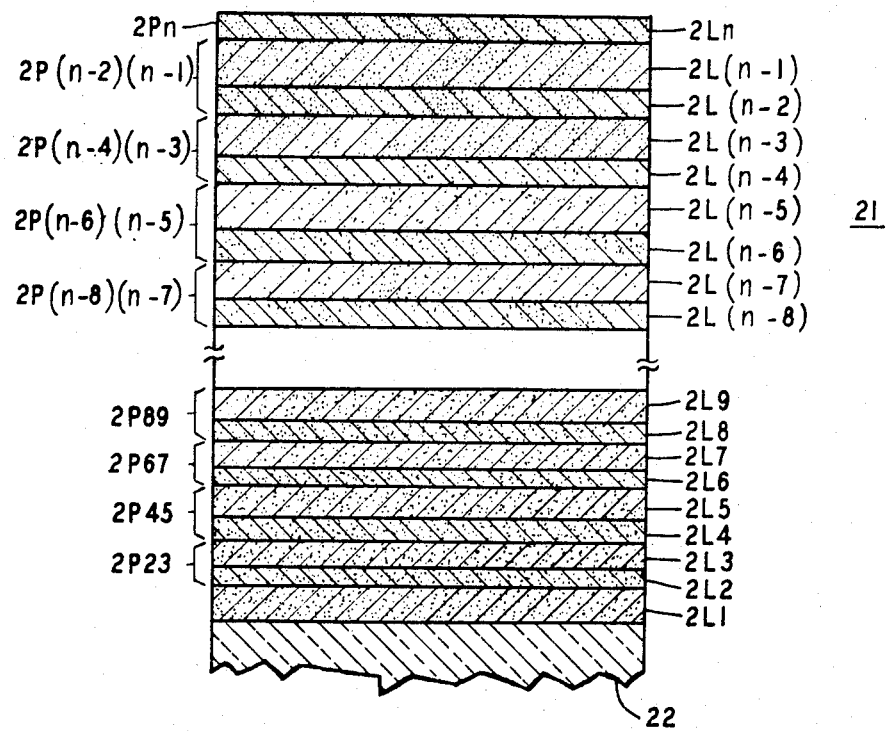
FIG. 2 is a schematic representation of a second illustrative embodiment of my invention.
Figure 3:
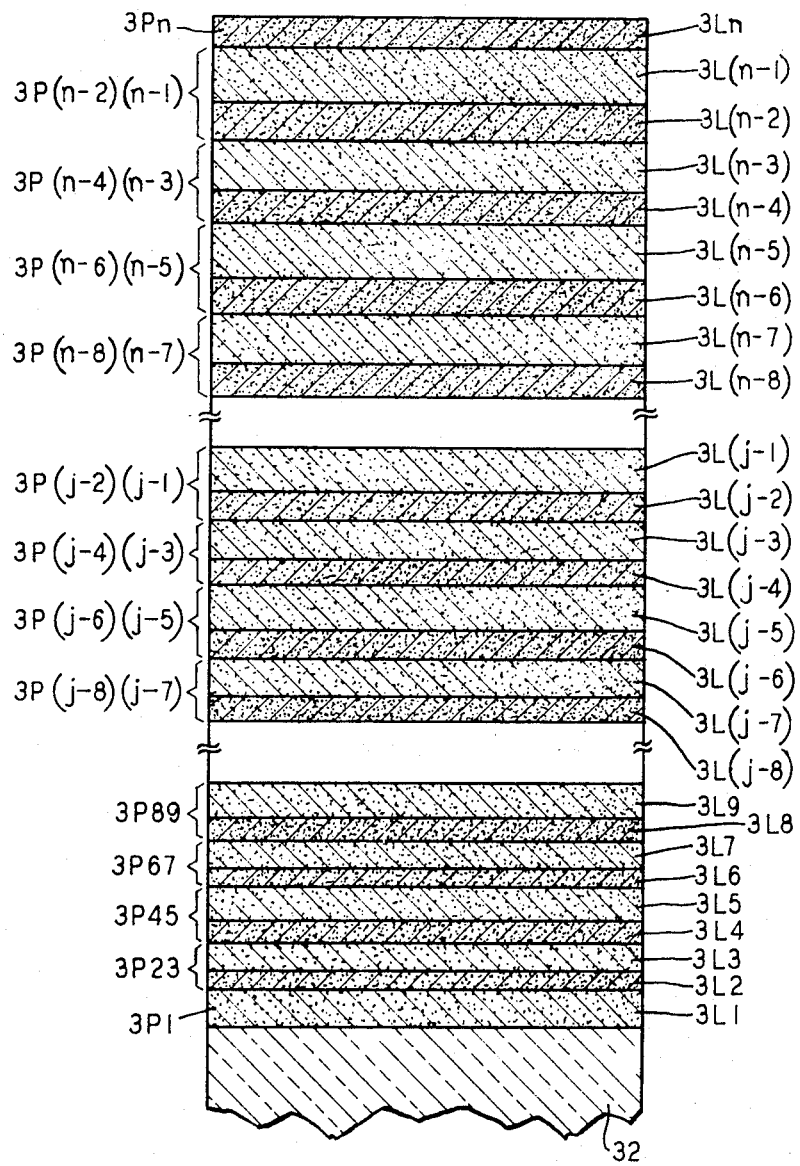
FIG. 3 is a schematic representation of a third illustrative embodiment of my invention.

Similarly, in FIG. 3 there is disclosed a typical three stack mirror 31 comprising a substrate 32 that is usually made of quartz, a first layer 3L1 that is deposited on substrate 32, and a multitude of layers 3L2 to 3Ln, where n is an even number, deposited one after another on the preceding layer. As with the mirrors shown in FIGS. 1 and 2, every odd-numbered layer has an index of refraction that ideally is the same and is as low as possible, and every even-numbered layer has an index of refraction that is the same and that is as high as possible. Again, according to my invention, a series of high-index—low-index pairs of layers are defined, in which, for example, layers 3L2 and 3L3 are designated high-index—low-index pair 3P23, layers 3L(j-2) and 3L(j-1) are designated pair 3P(j-2)(j-1), and layers 3L(n-2) and 3L(n-1) are designated pair 3P(n-2)(n-1), where j and n are even numbers. As before, pairs of layers such as 3L2 and 3L3 having a first optical thickness alternate with pairs of layers such as 3L4 and 3L5 and having a second optical thickness; and other pairs of layers such as 3L(j-8) and 3L(j-7) having a third optical thickness alternate with pairs of layers such as 3L(j-6) and 3L(j-5) having a fourth optical thickness. In addition, however, other pairs of layers such as 3L(n-8) and 3L(n-7) having a fifth optical thickness alternate with other pairs of layers such as 3L(n-6) and 3L(n-5) having a sixth optical thickness. As a result, mirror 31 comprises several pairs of layers in which at least some high-index—low-index pairs of layers having a first optical thickness alternate with at least some high-index—low-index pairs of layers having a second optical thickness, at least some high-index—low-index pairs of layers having a third optical thickness alternate with at least some high-index—low-index pairs of layers having a fourth optical thickness, and at least some high-index—low-index pairs of layers having a fifth optical thickness alternate with at least some high-index—low-index pairs of layers having a sixth optical thickness.

Mirrors having four or more stacks could also be designed; but because of scattering losses, an effort must be made to keep the total number of layers in the mirror coating down to a reasonable number. From my experience, it seems that a reasonable number is 40 to 60 layers and, as a result, the maximum number of stacks that appears feasible is about seven.

Obviously, many of the parameters in the above-described mirror designs are variable. For example, there are other low-refractive index materials that may be used in place of thorium fluoride and there are other high-refractive index materials that may be used in place of zinc sulfide. Some low-refractive index materials are cryolite, magnesium fluoride, and titanium dioxide. A high-refractive index material that typically is used with titanium dioxide is silicon dioxide. Other high- and low-refractive index materials are disclosed at page 20–16 of the Military Standardization Handbook on *Optical Design*, MIL-HDBK-141 (Oct. 1962). The particular combination of materials that should be used in the mirror coating depends on the wavelengths over which one desires high reflectance, on the ability to deposit uniform layers of these materials on a substrate and on each other, and on various optical and mechanical properties of the materials. For example, while the refractive index of materials usually varies somewhat with the wavelength, it is desirable to use materials in which this dispersion over the wavelengths of use is as small as possible. Similarly, it is desirable to use materials that can be conveniently evaporated to form uniform layers. And again, it is necessary that the material in these layers be compatible with each other and with the use for which they are intended. Thus, the two materials are useless if they interact with each other, if their thermal expansions are greatly different, if they absorb much light, or, in the case of mirrors used in laser systems, if they deteriorate rapidly under intense illumination. Of the materials studied, thorium fluoride and zinc sulfide have been found to be the most suitable for mirror coatings that are used with laser systems.

The mirror designs that have been shown in FIGS. 1, 2 and 3 are only illustrative of possible designs that may be made with my invention. While each of the designs of FIGS. 1, 2 and 3 has an even number of layers and a top layer of a high-refractive index material, mirror designs having an odd number of layers and/or a top layer of a low-refractive index are also feasible; and a design for such a mirror is given below.

As mentioned in discussing FIG. 1, the first layer in the coating, namely the layer deposited on the substrate itself, is a little different from the other layers. Specifically, because the first layer is deposited on the substrate, the index of refraction of the first layer appears to vary with the thickness of the first layer. Moreover, because the purpose of the first layer is more one of adhesion than a contribution to the total reflectance of the mirror, the thickness of the first layer is somewhat arbitrary. For convenience, I recommend using a thickness that can be easily monitored with the light source used to monitor the deposition of the layers.

As is customary in the art of dielectric mirror design, I have experimented with my mirror designs in an effort to obtain an optimized design that will produce the reflectances desired. In this procedure, I start with an initial design and by using equations well known in the art calculate the reflectance that would be achieved by it. The details of such equations are set forth in numerous sources such as chapter 1.6 of M. Born and E. Wolf's *Principles of Optics*, pages 51–70 (Third (Revised) Edition, Pergamon Press, Oxford, 1965); P. H. Berning's "Theory and Calculations of Optical Thin Films," appearing in *Physics of Thin Films*, Vol. 1 (edited by G. Haas, Academic Press, New York, 1963), and in particular the discussion at pages 87 to 90; and pages 20–8 and 20–9 of the above-mentioned Military Handbook on *Optical Design*. Once the reflectance of the initial design is determined, the design is then modified by changing the optical thicknesses of various layers and recomputing the reflectance repeatedly until a design having the desired characteristics is achieved.

For example, I have started with the following basic design in which the quarterwave optical thickness of each layer, which is four times its actual optical thickness, and the refractive index of each layer are as follows:

TABLE I

| Layer number | ¼-wave optical thickness (microns) | Refractive index | Layer number | ¼-wave optical thickness (microns) | Refractive index |
|---|---|---|---|---|---|
| Substrate: | | | | | |
| 1 | .63 | 1.48 | 25 | .55 | 1.51 |
| 2 | .41 | 2.40 | 26 | .70 | 2.40 |
| 3 | .41 | 1.51 | 27 | .70 | 1.51 |
| 4 | .49 | 2.40 | 28 | .55 | 2.40 |
| 5 | .49 | 1.51 | 29 | .55 | 1.51 |
| 6 | .41 | 2.40 | 30 | .70 | 2.40 |
| 7 | .41 | 1.51 | 31 | .70 | 1.51 |
| 8 | .49 | 2.40 | 32 | .55 | 2.40 |
| 9 | .49 | 1.51 | 33 | .55 | 1.51 |
| 10 | .41 | 2.40 | 34 | .89 | 2.40 |
| 11 | .41 | 1.51 | 35 | .89 | 1.51 |
| 12 | .49 | 2.40 | 36 | .78 | 2.40 |
| 13 | .49 | 1.51 | 37 | .78 | 1.51 |
| 14 | .41 | 2.40 | 38 | .89 | 2.40 |
| 15 | .41 | 1.51 | 39 | .89 | 1.51 |
| 16 | .49 | 2.40 | 40 | .78 | 2.40 |
| 17 | .49 | 1.51 | 41 | .78 | 1.51 |
| 18 | .41 | 2.40 | 42 | .89 | 2.40 |
| 19 | .41 | 1.51 | 43 | .89 | 1.51 |
| 20 | .55 | 2.40 | 44 | .78 | 2.40 |
| 21 | .55 | 1.51 | 45 | .78 | 1.51 |
| 22 | .70 | 2.40 | 46 | .89 | 2.40 |
| 23 | .70 | 1.51 | 47 | .89 | 1.51 |
| 24 | .55 | 2.40 Air | | | |

And using the equations set forth in the references above to optimize the basic design, I have evolved the following particular design:

TABLE II

| Layer number | ¼-wave optical thickness (microns) | Refractive index | Layer number | ¼-wave optical thickness (microns) | Refractive index |
|---|---|---|---|---|---|
| Substrate: | | | | | |
| 1 | .63 | 1.48 | 25 | .60 | 1.51 |
| 2 | .45 | 2.40 | 26 | .70 | 2.40 |
| 3 | .45 | 1.51 | 27 | .70 | 1.51 |
| 4 | .47 | 2.40 | 28 | .55 | 2.40 |
| 5 | .47 | 1.51 | 29 | .55 | 1.51 |
| 6 | .41 | 2.40 | 30 | .73 | 2.40 |
| 7 | .41 | 1.51 | 31 | .68 | 1.51 |
| 8 | .49 | 2.40 | 32 | .53 | 2.40 |
| 9 | .49 | 1.51 | 33 | .51 | 1.51 |
| 10 | .41 | 2.40 | 34 | .89 | 2.40 |
| 11 | .41 | 1.51 | 35 | .89 | 1.51 |
| 12 | .49 | 2.40 | 36 | .82 | 2.40 |
| 13 | .49 | 1.51 | 37 | .78 | 1.51 |
| 14 | .47 | 2.40 | 38 | .89 | 2.40 |
| 15 | .47 | 1.51 | 39 | .89 | 1.51 |
| 16 | .49 | 2.40 | 40 | .78 | 2.40 |
| 17 | .49 | 1.51 | 41 | .82 | 1.51 |
| 18 | .47 | 2.40 | 42 | .89 | 2.40 |
| 19 | .47 | 1.51 | 43 | .84 | 1.51 |
| 20 | .51 | 2.40 | 44 | .78 | 2.40 |
| 21 | .51 | 1.51 | 45 | .78 | 1.51 |
| 22 | .60 | 2.40 | 46 | .89 | 2.40 |
| 23 | .53 | 1.51 | 47 | .84 | 1.51 |
| 24 | .60 | 2.40 Air | | | |

Figure 4:
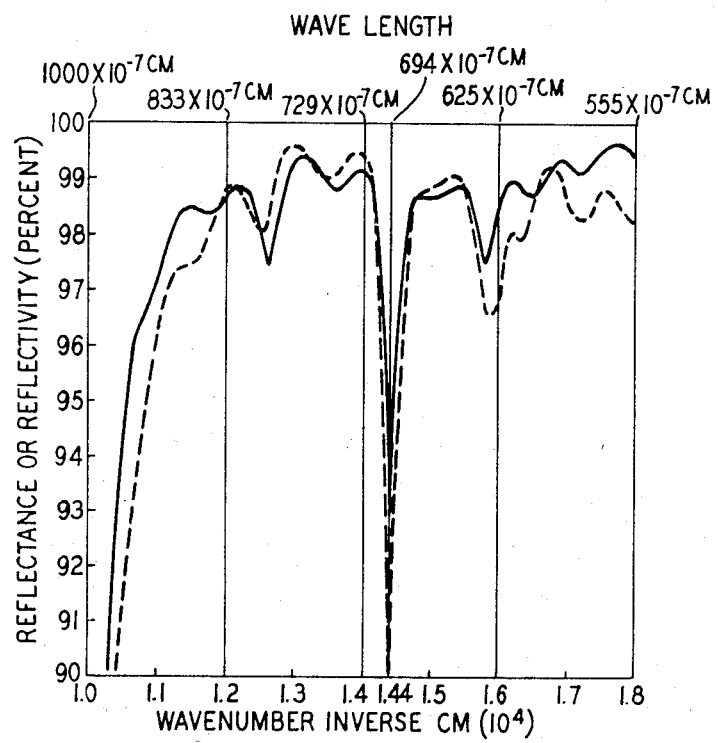
FIG. 4 is a plot of reflectivity versus wavenumber and wavelength for an illustrative embodiment of my invention.

A plot of the calculated reflectance, or reflectivity, versus wavenumber, and wavelength, of this mirror is shown in FIG. 4. Note that the reflectance, or reflectivity, of the mirror is for the most part between 98 and 99½ percent over quite a wide bandwidth. At 14,400 cm.$^{-1}$ wavenumbers there is a transmission peak of approximately 8 percent. Such a transmission peak may be useful in parametric oscillators where a narrow transmission region is frequently desirable to permit pumping of the oscillator by a light beam having a frequency that is passed by the transmission peak.

As is well known in the art, the region in which this mirror has these characteristics can be varied simply by increasing or decreasing each optical thickness in the mirror by a constant percentage. Thus if it is desired to double the wavenumber at which peak transmission occurs, it is, ideally, only necessary to reduce the optical thickness of each layer in the mirror by 50 percent. In fact, it may or may not be practical to do this depending on the characteristics of the materials in the mirror at the other wavelengths. In some cases the changes are slight and no problem is encountered. In other cases, however, the dispersion of the materials may be such that their refractive index over the desired bandwidth is not constant. In such cases, adjustments must be made in the design. Following standard practices, these adjustments involve the addition of pairs of layers to each of the stacks in my mirror design, as in the case where the reflectance bandwidth of a mirror of thorium fluoride and zinc sulfide layers is shifted to the infrared; and the removal of pairs of layers from each of the stacks, as in the case where the reflectance bandwidth of a mirror of thorium fluoride and zinc sulfide layers is shifted toward the ultraviolet. Exactly what layers are added or deleted can ordinarily be determined fairly easily by trial and error.

Figure 5A:
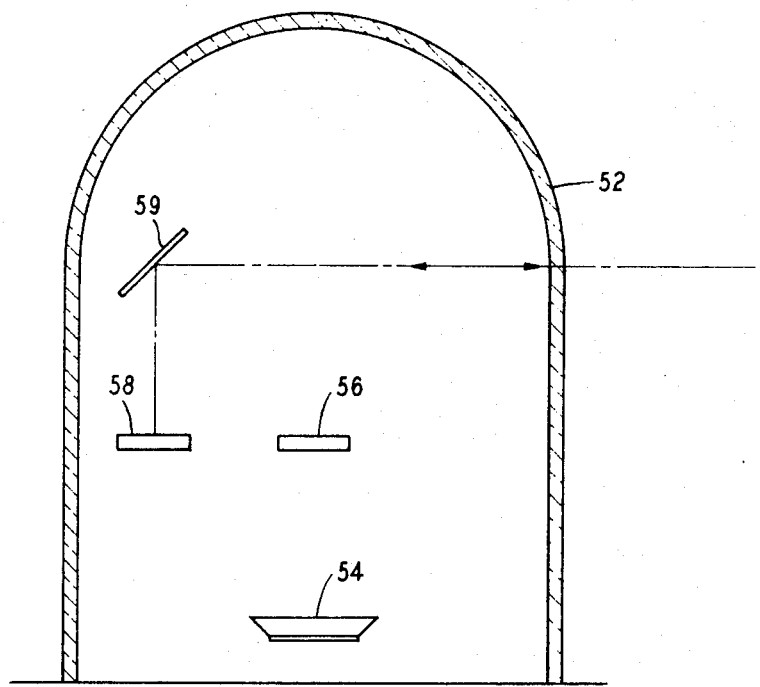
FIG. 5A and 5B are schematic representation of apparatus used to form illustrative embodiments of my invention.

To form the mirror, I use a commercial vacuum coating unit such as that described in extensive detail in the above-mentioned paper by D. L. Perry. FIG. 5A shows a side view of such a unit, referred to generally as element 51, and comprises an airtight casing 52 that can be evacuated to pressures ranging from 1 to $5 \times 10^{-5}$ torr by appropriate pumps that are not shown. Within casing 52 are located a container 54 holding the dielectric materials to be evaporated, a substrate 56 and a monitor slide 58 onto which the dielectric is evaporated, and a mirror 59 for reflecting light to the monitor slide.

Figure 5B:
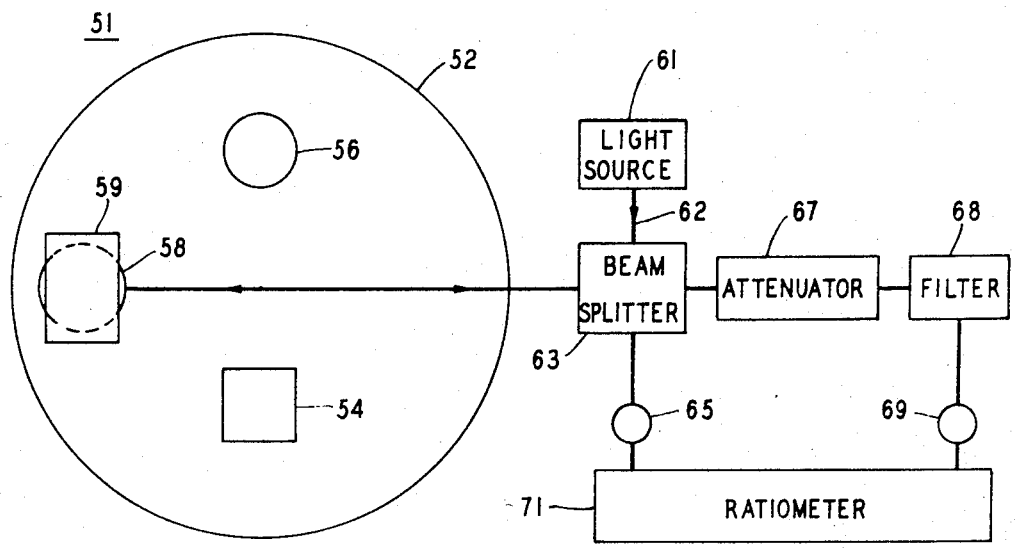

Shown in FIG. 5B is a top view of the same vacuum coating unit 51 and a schematic representation of means for monitoring the light reflected from monitor slide 58. This means comprises a source of light 61 which typically is a laser, a beam splitter 63 on which is incident a light beam 62 from source 61, a light cell 65 on which is incident that part of light beam 62 that passes through beam splitter 63, an attenuator 67, a filter 68, and a second light cell 69 on which is incident that part of light beam 62 that is first reflected by beam splitter 63 and then reflected by monitor slide 58 and transmitted by beam splitter 63. Also shown in block form is a ratiometer 71 that compares the intensity of light incident on cell 69 with the intensity of light incident on cell 65.

As detailed in the paper by D. L. Perry, a dielectric layer is deposited on substrate 56 by heating one of the dielectric materials contained in container 54 with suitable heating means (not shown). Simultaneously, a layer is also formed on monitor slide 58. The progressive increase in thickness of the layer with time can be monitored quite easily because the amount of light reflected from monitor slide 58 varies with the thickness of the layer. Moreover, with mirrors having layers with optical thicknesses that are all one-quarter the wavelength of the incident light, a plot of the reflectance of the mirror with optical thickness goes through a maximum or a minimum at every quarter wavelength. Consequently, the operator of such a vacuum coating unit simply terminates the deposition of one layer of dielectric when he notes that the reflectance has reached a maximum or a minimum; and thereupon commences the deposition of a second layer of dielectric. Because the difference between adjacent maxima and minima decreases with increasing number of layers deposited on the monitor slide, the monitor slide is typically changed after every fourth layer is deposited.

While this method is reasonably practical for the deposition of layers having quarter wavelength optical thickness at the laser wavelength, it is not practical with the deposition of layers of different optical thicknesses because the reflectance at the desired optical thickness is not necessarily a maxima or a minima. Consequently, it has in the past been quite difficult to form mirrors having precisely the different optical thicknesses desired. I have, however, found a method for conveniently monitoring the deposition of these layers. In advance of the formation of the mirror, I determine the slope of the plot of reflectance versus layer thickness that should be observed when each layer to be formed has various incremental optical thicknesses. Then, when the mirror is being fabricated, I monitor the reflectance continuously and terminate deposition of a given layer when the slope of the reflectance versus thickness curve that is observed becomes substantially the same as the curve that I calculated in advance. As might be expected, the calculation of the slope of the plot of reflectance versus layer of thickness is similar to the calculation of reflectance for the various parameters of each of the layers in the mirror and involves little more than the determination of the reflectance at several incremental optical thicknesses within each layer.

With the aid of this monitoring technique, a mirror was constructed for the parameters set forth in table II above. The reflectance of this mirror was then measured and found to be that represented by the dotted line in FIG. 4. Obviously, close agreement can be achieved with this monitoring technique between the theoretical design and the device that is actually fabricated.

Numerous variations to my invention have been detailed above. Still others will be apparent to those skilled in the art without departing from the spirit and scope of the invention.

What is claimed is:

1. An optical filter comprising a plurality of superimposed layers in which layers of a first material having a first index of refraction alternate with layers of a second material having a second index of refraction, thereby defining a plurality of high-index—low-index pairs of layers, characterized in that at least some high-index—low-index pairs of layers in which each layer has a first optical thickness alternate with at least some high-index—low-index pairs of layers in which each layer has a second optical thickness to form a filter in which the pattern of layer thickness is AABB . . . AABB where A represents one optical thickness and B the other optical thickness.

2. The filter of claim 1 further characterized in that at least some high-index—low-index pairs of layers in which each layer has a third optical thickness alternate with at least some high-index—low-index pairs of layers in which each layer has a fourth optical thickness.

3. The filter of claim 2 further characterized in that at least some high-index—low-index pairs of layers in which each layer has a fifth optical thickness alternate with at least some high-index—low-index pairs of layers in which each layer has a sixth optical thickness.

4. The filter of claim 3 in which the ratio of the first optical thickness to the second optical thickness is 41/49, the ratio of the first optical thickness to the third optical thickness is 41/55, the ratio of the first optical thickness to the fourth optical thickness is 41/70, the ratio of the first optical thickness to the fifth optical thickness is 41/78, and the ratio of the first optical thickness to the sixth optical thickness is 41/89.

5. The filter of claim 1 wherein the relative optical thicknesses of the layers are as follows:

| Layer No. | Relative Optical Thickness | Layer No. | Relative Optical Thickness |
|---|---|---|---|
| substrate | | | |
| 1 | 0.63 | 25 | 0.55 |
| 2 | 0.41 | 26 | 0.70 |
| 3 | 0.41 | 27 | 0.70 |
| 4 | 0.49 | 28 | 0.55 |
| 5 | 0.49 | 29 | 0.55 |
| 6 | 0.41 | 30 | 0.70 |
| 7 | 0.41 | 31 | 0.70 |
| 8 | 0.49 | 32 | 0.55 |
| 9 | 0.49 | 33 | 0.55 |
| 10 | 0.41 | 34 | 0.89 |
| 11 | 0.41 | 35 | 0.89 |
| 12 | 0.49 | 36 | 0.78 |
| 13 | 0.49 | 37 | 0.78 |
| 14 | 0.41 | 38 | 0.89 |
| 15 | 0.41 | 39 | 0.89 |
| 16 | 0.49 | 40 | 0.78 |
| 17 | 0.49 | 41 | 0.78 |
| 18 | 0.41 | 42 | 0.89 |
| 19 | 0.41 | 43 | 0.89 |
| 20 | 0.55 | 44 | 0.78 |
| 21 | 0.55 | 45 | 0.78 |
| 22 | 0.70 | 46 | 0.89 |
| 23 | 0.70 | 47 | 0.89 |
| 24 | 0.55 | air | |

6. The filter of claim 5 wherein the quarterwave optical thickness of each layer, said quarterwave optical thickness being four times actual optical thickness, is as follows:

| Layer No. | ¼-Wave Optical Thickness (microns) | Layer No. | ¼-Wave Optical Thickness (microns) |
|---|---|---|---|
| substrate | | | |
| 1 | 0.63 | 25 | 0.60 |
| 2 | 0.45 | 26 | 0.70 |
| 3 | 0.45 | 27 | 0.70 |
| 4 | 0.47 | 28 | 0.55 |
| 5 | 0.47 | 29 | 0.55 |
| 6 | 0.41 | 30 | 0.73 |
| 7 | 0.41 | 31 | 0.68 |
| 8 | 0.49 | 32 | 0.53 |
| 9 | 0.49 | 33 | 0.51 |
| 10 | 0.41 | 34 | 0.89 |
| 11 | 0.41 | 35 | 0.89 |
| 12 | 0.49 | 36 | 0.82 |
| 13 | 0.49 | 37 | 0.78 |
| 14 | 0.47 | 38 | 0.89 |
| 15 | 0.47 | 39 | 0.89 |
| 16 | 0.49 | 40 | 0.78 |
| 17 | 0.49 | 41 | 0.82 |
| 18 | 0.47 | 42 | 0.89 |
| 19 | 0.47 | 43 | 0.84 |
| 20 | 0.51 | 44 | 0.78 |
| 21 | 0.51 | 45 | 0.78 |
| 22 | 0.60 | 46 | 0.89 |
| 23 | 0.53 | 47 | 0.84 |
| 24 | 0.60 | air | |

7. A method of designing an optical filter that substantially has a desired reflectance and comprises a plurality of superimposed layers in which layers of a first material having a first index of refraction alternate with layers of a second material having a second index of refraction, thereby defining a plurality of high-index—low-index pairs of layers, comprising the steps of:
   forming an initial design in which is specified the relative optical thickness of each of several layers of the optical coating, and
   varying the relative optical thickness of layers of the initial design to alter the reflectance of the coating toward the reflectance that is desired,
   characterized in that the step of forming the initial design comprises the step of forming a design in which the relative optical thickness of the layers in at least some high-index—low-index pairs of layers are the same and at least some high-index—low-index pairs of layers in which each layer has a first relative optical thickness alternate with at least some high-index—low-index pairs of layers in which each layer has a second relative optical thickness so that the pattern of layer thicknesses in the design is AABB . . . AABB where A represents one optical thickness and B the other optical thickness.

8. The method of claim 7 further characterized in that the step of forming the initial design comprises the step of forming a design in which the relative optical thicknesses of the layers in at least some high-index—low-index pairs of layers are the same, at least some high-index—low-index pairs of layers in which each layer has a first relative optical thickness alternate with at least some high-index—low-index pairs of layers in which each layer has a second relative optical thickness, at least some high-index—low-index pairs of layers in which each layer has a third relative optical thickness alternate with at least some high-index—low-index pairs of layers in which each layer has a fourth relative optical thickness, and at least some high-index—low-index pairs of layers in which each layer has a fifth relative optical thickness alternate with at least some high-index—low-index pairs of layers in which each layer has a sixth relative optical thickness.

9. The method of claim 8 further characterized in that in the initial design the ratio of the first optical thickness to the second optical thickness is 41/49, the ratio of the first optical thickness to the third optical thickness is 41/55, the ratio of the first optical thickness to the fourth optical thickness is 41/70, the ratio of the first optical thickness to the fifth optical thickness is 41/78, and the ratio of the first optical thickness to the sixth optical thickness is 41/89.

10. The method of forming an optical filter on a substrate comprising the steps of:
   calculating in advance of the formation of the optical coating a slope of a plot of reflectance versus layer thickness that should be observed when each layer to be formed has various incremental optical thicknesses,
   comparing during the fabrication of the filter the slope of a reflectance versus optical thickness plot that is observed with the slope of reflectance versus layer thickness that has been calculated,
   and terminating formation of a layer when the slope of the reflectance versus thickness plot that is observed becomes substantially the same as the slope that was calculated in advance for the particular optical thickness that is desired for the layer.

* * * * *